US011898510B1

(12) United States Patent
Hyodoh et al.

(10) Patent No.: US 11,898,510 B1
(45) Date of Patent: Feb. 13, 2024

(54) FILTER REGENERATION CONTROL DEVICE

(71) Applicant: TOYOTA JIDOSHA KABUSHIKI KAISHA, Aichi-ken (JP)

(72) Inventors: Junji Hyodoh, Toyota (JP); Masanao Idogawa, Nagoya (JP); Machiko Takahashi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/325,116

(22) Filed: May 30, 2023

(30) Foreign Application Priority Data

Jul. 27, 2022 (JP) ................................ 2022-119640

(51) Int. Cl.

*F02D 41/02* (2006.01)
*F01N 9/00* (2006.01)
*F02D 41/08* (2006.01)
*F01N 3/025* (2006.01)

(52) U.S. Cl.

CPC ......... *F02D 41/029* (2013.01); *F01N 3/0253* (2013.01); *F01N 9/002* (2013.01); *F02D 41/08* (2013.01); *F01N 2430/02* (2013.01); *F01N 2430/06* (2013.01); *F01N 2590/11* (2013.01); *F02D 2200/0812* (2013.01); *F02D 2200/101* (2013.01); *F02D 2200/501* (2013.01)

(58) Field of Classification Search

CPC .... F01N 3/0253; F01N 9/002; F01N 2430/02; F01N 2430/06; F01N 2590/11; F02D 41/029; F02D 41/08; F02D 2200/0812; F02D 2200/101; F02D 2200/501

USPC ................ 60/285, 295, 311, 320; 123/198 F

See application file for complete search history.

(56) References Cited

U.S. PATENT DOCUMENTS

2004/0123589 A1* 7/2004 Ohtake ................. F02D 41/029 60/297
2005/0050883 A1* 3/2005 Nishimura .......... F02D 41/0225 60/286
2009/0025372 A1* 1/2009 Onodera ............ F02D 41/0245 60/286
2010/0043403 A1 2/2010 Minamikawa et al.

FOREIGN PATENT DOCUMENTS

JP 3755495 B2 * 3/2006 ........... F01N 13/009
JP 2008-267199 A 11/2008
JP 2020-029800 A 2/2020

* cited by examiner

*Primary Examiner* — Jorge L Leon, Jr.

(74) *Attorney, Agent, or Firm* — HAUPTMAN HAM, LLP

(57) ABSTRACT

A filter regeneration control device includes a fuel supply controller configured to stop, when there is a forced regeneration request for burning particulate matter collected in a filter provided in an exhaust passage of an engine that is a traveling power source of a vehicle while the vehicle is stopped, fuel supply to at least one of a plurality of cylinders of the engine while supplying fuel to the cylinder other than the at least one cylinder, and a rotation speed controller configured to control a rotation speed of the engine when the forced regeneration request is issued to be higher than a rotation speed when the forced regeneration request is not issued and during an idle operation of the engine while the vehicle is stopped.

3 Claims, 3 Drawing Sheets

FILTER REGENERATION CONTROL DEVICE

CROSS-REFERENCE TO RELATED APPLICATION

This application claims priority to Japanese Patent Application No. 2022-119640 filed on Jul. 27, 2022, incorporated herein by reference in its entirety.

BACKGROUND

1. Technical Field

The present disclosure relates to a filter regeneration control device.

2. Description of Related Art

There is known forced regeneration control of forcibly regenerating a filter while a vehicle travels under a predetermined traveling condition (refer to, for example, Japanese Unexamined Patent Application Publication No. 2020-029800 (JP 2020-029800 A)).

SUMMARY

The vehicle needs to travel under the predetermined traveling condition to execute the forced regeneration control. For this reason, the forced regeneration control may be difficult to be easily started. Further, such forced regeneration control can be preferably completed early.

An object of the present disclosure is to provide a filter regeneration control device capable of easily starting and early completing forced regeneration control.

A first aspect of the disclosure relates to a filter regeneration control device including a fuel supply controller and a rotation speed controller. The fuel supply controller is configured to stop, when there is a forced regeneration request for burning particulate matter collected in a filter provided in an exhaust passage of an engine that is a traveling power source of a vehicle while the vehicle is stopped, fuel supply to at least one of a plurality of cylinders of the engine while supplying fuel to the cylinder other than the at least one cylinder. The rotation speed controller is configured to control a rotation speed of the engine when the forced regeneration request is issued to be higher than a rotation speed when the forced regeneration request is not issued and during an idle operation of the engine while the vehicle is stopped.

The vehicle may be equipped with a motor as the traveling power source. The rotation speed controller may control the rotation speed of the engine when the forced regeneration request is issued to be higher than a rotation speed of the engine when the forced regeneration request is not issued and when the motor is in a regenerative operation while the vehicle is stopped.

An ignition timing controller configured to control an ignition timing of the cylinder other than the at least one cylinder when the forced regeneration request is issued to be the same as an ignition timing when the forced regeneration request is not issued and during the idle operation of the engine while the vehicle is stopped may be provided.

According to the present disclosure, the filter regeneration control device capable of easily starting and early completing the forced regeneration control can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Hybrid Electric Vehicle

Figure 1:
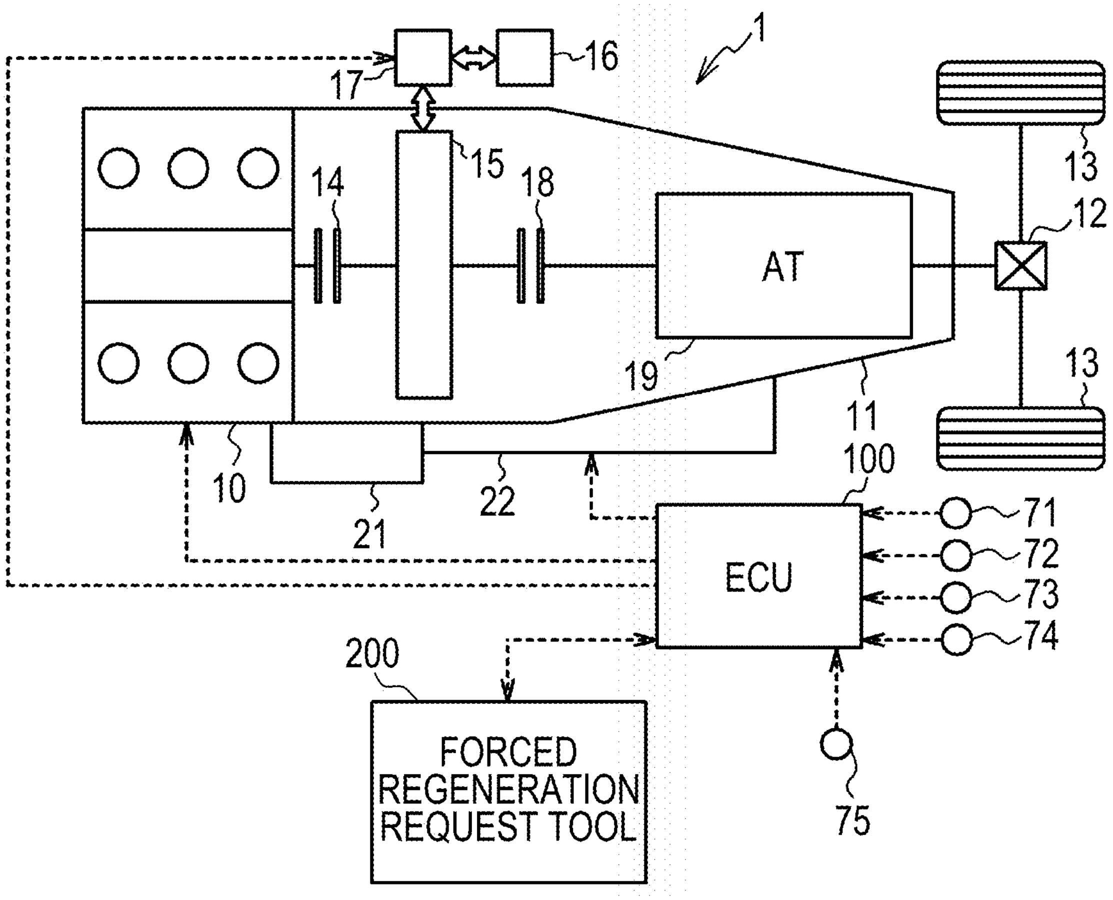
FIG. 1 is a schematic configuration diagram of a hybrid electric vehicle.

FIG. 1 is a schematic configuration diagram of a hybrid electric vehicle 1. The hybrid electric vehicle 1 is provided with a K0 clutch 14, a motor 15, a wet clutch 18, and a transmission 19 in this order in a power transmission path from an engine 10 to drive wheels 13. The engine 10 and the motor 15 are mounted as a traveling power source of the hybrid electric vehicle 1. The engine 10 is, for example, a V-type six-cylinder gasoline engine, but the number of cylinders is not limited thereto, and may be an inline gasoline engine or a diesel engine. The K0 clutch 14, the motor 15, the wet clutch 18, and the transmission 19 are provided within a transmission unit 11. The transmission unit 11 and the right and left drive wheels 13 are drivingly connected via a differential 12.

The K0 clutch 14 is provided between the engine 10 and the motor 15 on the same power transmission path. The K0 clutch 14 is supplied with hydraulic pressure from a disengaged state to be in an engaged state to connect power transmission between the engine 10 and the motor 15. The K0 clutch 14 is in the disengaged state when the supply of hydraulic pressure is stopped, and cuts off the power transmission between the engine 10 and the motor 15. The engaged state is a state in which both engagement elements of the K0 clutch 14 are connected and the engine 10 and the motor 15 are at the same rotation speed. The disengaged state is a state in which both engagement elements of the K0 clutch 14 are separated.

The motor 15 is connected to a battery 16 via an inverter 17. The motor 15 functions as a motor that generates driving force for the vehicle according to electric power supply from the battery 16 and further functions as a generator that generates electric power to charge the battery 16 according to the power transmission from the engine 10 or the drive wheels 13. The electric power exchanged between the motor 15 and the battery 16 is adjusted by the inverter 17.

The inverter 17 is controlled by an electronic control unit (ECU) 100 described below and converts a direct current voltage from the battery 16 into an alternating current voltage or converts an alternating current voltage from the motor 15 into a direct current voltage. In a power running operation in which the motor 15 outputs torque, the inverter 17 converts the direct current voltage of the battery 16 into the alternating current voltage to adjust the electric power supplied to the motor 15. In a regenerative operation in which the motor 15 generates the electric power, the inverter 17 converts the alternating current voltage from the motor 15 into the direct current voltage to adjust the electric power supplied to the battery 16.

The transmission 19 is a stepped automatic transmission that switches gear ratios in multiple stages by switching gear stages, but is not limited thereto and may be a continuously variable automatic transmission. The transmission 19 is provided between the motor 15 and the drive wheels 13 on the power transmission path. The wet clutch 18 that receives the supply of hydraulic pressure to be in the engaged state to directly connect the motor 15 and the transmission 19 is provided.

The transmission unit 11 is further provided with an oil pump 21 and a hydraulic pressure control mechanism 22. The hydraulic pressure generated by the oil pump 21 is supplied to the K0 clutch 14, the wet clutch 18, and the transmission 19 via the hydraulic pressure control mechanism 22, respectively. The hydraulic pressure control mechanism 22 is provided with respective hydraulic pressure circuits for the K0 clutch 14, the wet clutch 18, and the transmission 19, and various hydraulic pressure control valves for controlling operating hydraulic pressures thereof. A torque converter including a lockup clutch may be provided instead of the wet clutch 18.

The hybrid electric vehicle 1 is provided with the ECU 100 as a control device for the vehicle. The ECU 100 is an electronic control unit that includes an arithmetic processing circuit performing various kinds of arithmetic processing related to vehicle travel control and a memory storing a control program or data. The ECU 100 functionally realizes a fuel supply controller, a rotation speed controller, and an ignition timing controller, which will be described below in detail.

The ECU 100 controls driving of the engine 10 and the motor 15. Specifically, the ECU 100 controls a throttle opening degree, ignition timing, and fuel injection amount of the engine 10 to control the torque or rotation speed of the engine 10. The ECU 100 adjusts an amount of electric power exchanged between the motor 15 and the battery 16 by controlling the inverter 17 to control the rotation speed or torque of the motor 15. The ECU 100 also controls driving of the K0 clutch 14, the wet clutch 18, and the transmission 19 through the control of the hydraulic pressure control mechanism 22.

Signals from an ignition switch 71, a crank angle sensor 72, a motor rotation speed sensor 73, an airflow meter 74, and an air-fuel ratio sensor 75 are input to the ECU 100. The crank angle sensor 72 detects a rotation speed of a crankshaft of the engine 10, that is, an engine rotation speed. The motor rotation speed sensor 73 detects a rotation speed of an output shaft of the motor 15. The airflow meter 74 detects an intake air amount of the engine 10. The air-fuel ratio sensor 75 detects an air-fuel ratio of exhaust gas that has passed through a three-way catalyst 43.

The ECU 100 causes the hybrid electric vehicle 1 to travel in any traveling mode of an electric traveling mode (hereinafter referred to as battery electric vehicle (BEV) mode) and a hybrid traveling mode (hereinafter referred to as hybrid electric vehicle (HEV) mode). In the BEV mode, the ECU 100 releases the K0 clutch 14 and the vehicle travels with the power of the motor 15. In the HEV mode, the ECU 100 switches the K0 clutch 14 to the engaged state and the vehicle travels with at least the power of the engine 10. The HEV mode includes a mode in which the vehicle travels with the power of the engine 10 solely and a mode in which the vehicle travels using both the engine 10 and the motor 15 as power sources by causing the motor 15 to perform the power running operation.

The traveling mode is switched based on requested driving force for the vehicle obtained from a vehicle speed and an accelerator operation amount, state of charge (SOC) indicating an amount of charge in the battery 16, and the like. For example, when the requested driving force is relatively small and the SOC is relatively high, the BEV mode is selected. When the requested driving force is relatively large or when the SOC of the battery 16 is relatively low, the HEV mode is selected.

A forced regeneration request tool 200 manually operated by a vehicle mechanic or the like at a car dealer or a maintenance shop (hereinafter collectively referred to as "maintenance shop") is connected to the ECU 100 by wire or wirelessly. With the manual operation of the forced regeneration request tool 200, a forced regeneration request described below is input to the ECU 100. The forced regeneration request tool 200 is, for example, a computer device having an operation input section and a display section and transmits a control signal to the ECU 100 in accordance with an operation input by the vehicle mechanic. Further, the forced regeneration request tool 200 may be configured to receive information about a degree of work progress or a work result from the ECU 100.

Schematic Configuration of Engine

Figure 2:
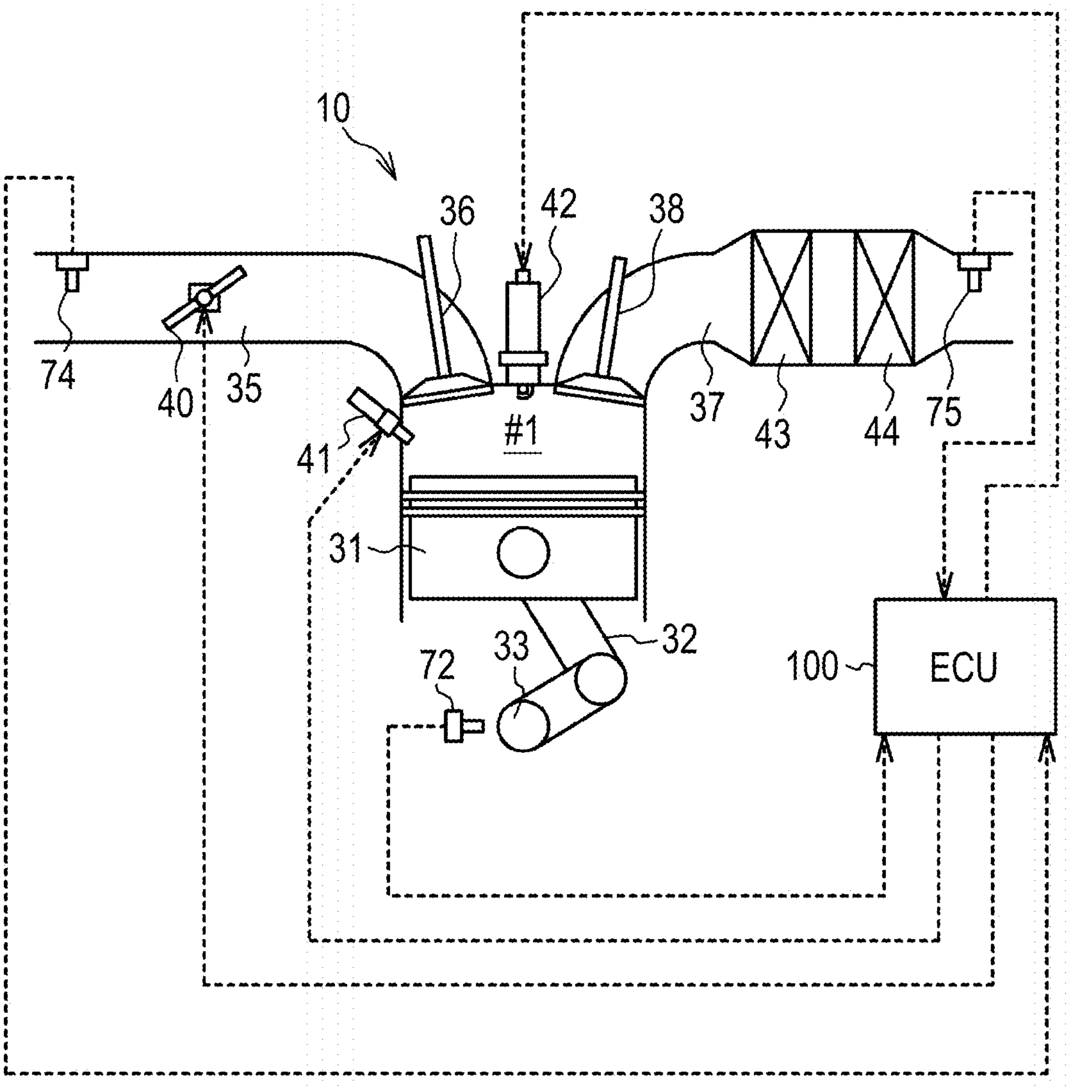
FIG. 2 is a schematic configuration diagram of an engine.

FIG. 2 is a schematic configuration diagram of the engine 10. The engine has a cylinder #1, a piston 31, a connecting rod 32, a crankshaft 33, an intake passage 35, an intake valve 36, an exhaust passage 37, and an exhaust valve 38. Solely one of four cylinders #1, #2, #3, #4 of the engine 10 is shown in FIG. 2. An air-fuel mixture is combusted in each of the cylinders #1, #2, #3, #4. The piston 31 is housed in each of the cylinders #1, #2, #3, #4 in a reciprocating manner and is connected to crankshaft 33 that is an output shaft of engine 10 via connecting rod 32. The connecting rod 32 converts the reciprocating motion of the piston 31 into a rotational motion of the crankshaft 33.

The intake passage 35 is connected to an intake port of each of the cylinders #1, #2, #3, #4 via the intake valve 36. The exhaust passage 37 is connected to an exhaust port of each of the cylinders #1, #2, #3, #4 via the exhaust valve 38. The intake passage 35 is provided with an airflow meter 74 and a throttle valve 40 that adjusts the intake air amount.

The exhaust passage 37 is provided with the three-way catalyst 43 and a gasoline particulate filter (GPF) 44 from an upstream side. The three-way catalyst 43 contains catalytic metals, such as platinum (Pt), palladium (Pd), and rhodium (Rh), has oxygen storage capacity, and cleans NOx, HC, and CO.

The GPF 44 is a porous ceramic structure and collects an exhaust particulate (hereinafter referred to as particulate matter (PM)) in the exhaust gas. Further, the GPF 44 carries a precious metal, such as platinum. During regeneration control, this precious metal accelerates an oxidation reaction of accumulated PM. The GPF 44 is an example of a filter. For example, when the engine 10 is a diesel engine, a diesel particulate filter (DPF) is provided instead of the GPF 44. An air-fuel ratio sensor 75 is provided downstream of the GPF 44 in the exhaust passage 37.

An in-cylinder injection valve 41 is provided for each of the cylinders #1, #2, #3, #4. The in-cylinder injection valve 41 directly injects the fuel into each of the cylinders #1, #2, #3, #4. Instead of or in addition to the in-cylinder injection valve 41, a port injection valve that injects the fuel may be provided toward the intake port. Each of the cylinders #1, #2, #3, #4 is provided with an ignition device 42 that ignites the air-fuel mixture of intake air introduced through the intake passage 35 and the fuel injected by the in-cylinder injection valve 41 by spark discharge.

Control Executed by ECU

Figure 3:
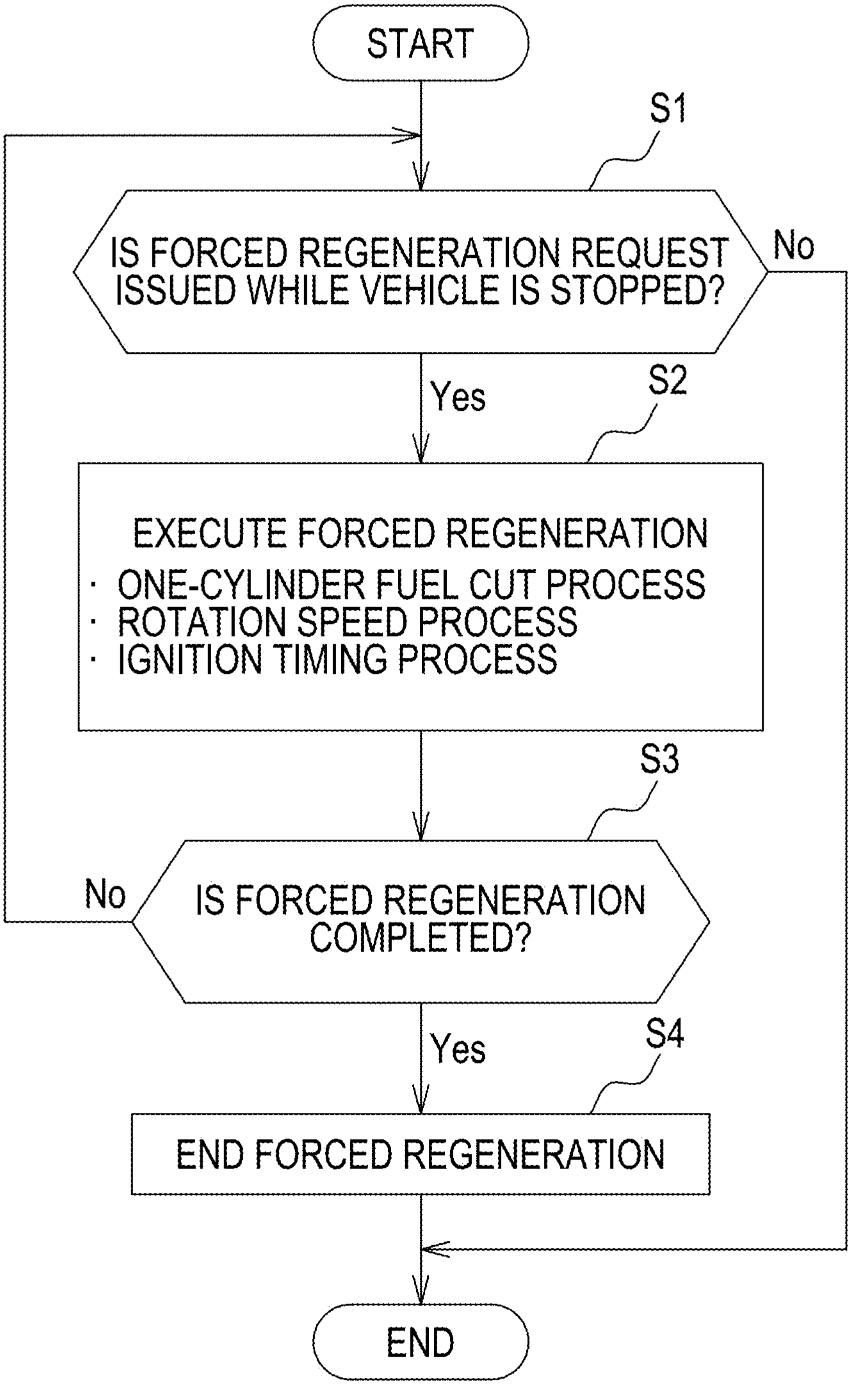
FIG. 3 is a flowchart showing an example of control executed by an ECU.

FIG. 3 is a flowchart showing an example of the control executed by the ECU 100. The present control is repeatedly executed for each predetermined cycle in a state in which the ignition is on. The ECU 100 determines whether or not the forced regeneration request is issued from the forced regeneration request tool 200 while the hybrid electric vehicle 1 is stopped (step S1). In a case of No in step S1, the present control ends. In a case of Yes in step S1, the ECU 100 executes the forced regeneration control (step S2). The forced regeneration control is realized by executing a one-cylinder fuel cut process, a rotation speed process, and an ignition timing process, which will be described below, while the K0 clutch 14 is controlled to be in the disengaged state. In this manner, the forced regeneration control can be easily started while the hybrid electric vehicle 1 is stopped. Step S2 is an example of the processes executed by the fuel supply controller, the rotation speed controller, and the ignition timing controller.

Next, the ECU 100 determines whether or not the forced regeneration is completed (step S3). For example, the ECU 100 may determine that the forced regeneration is completed, assuming that the combustion of the particulate matter collected in the GPF 44 is completed when a differential pressure before and behind the GPF 44 is equal to or less than a threshold value. In a case of No in step S3, the process after step S1 is executed again. In a case of Yes in step S3, the ECU 100 ends the forced regeneration control (step S4).

Details of the forced regeneration control will be described. First, the one-cylinder fuel cut process will be described. When the forced regeneration request is issued, the ECU 100 executes the one-cylinder fuel cut process of stopping the fuel supply to any one of the four cylinders #1, #2, #3, #4 of the engine 10 and supplying the fuel to the other cylinders. For example, the fuel supply to the cylinder #1 is stopped, and the fuel injection amount and intake air amount for the other cylinders #2, #3, #4 are adjusted such that the air-fuel ratio is on a richer side than a stoichiometric air-fuel ratio. Accordingly, surplus fuel exhausted from the cylinder controlled to have a rich air-fuel ratio adheres to the GPF 44 and combusts in a lean atmosphere with air exhausted from the cylinder to which the fuel supply is stopped. Accordingly, the particulate matter accumulated in the GPF 44 is combusted to regenerate the GPF 44.

For example, the fuel supply to all the cylinders #1, #2, #3, #4 is stopped when the forced regeneration request is issued, and the fuel supply to all the cylinders #1, #2, #3, #4 is considered to be restarted when the engine rotation speed is equal to or less than a restart rotation speed. In this case, the combustion is not being performed in any of the cylinders while the fuel supply is stopped and the hybrid electric vehicle 1 is stopped. For this reason, there is no power to forcibly cause the engine 10 to rotate from the outside, and there is a risk that the engine rotation speed is reduced more significantly than the restart rotation speed and the engine is stalled. In the present embodiment, with the execution of the one-cylinder fuel cut process of stopping the fuel supply to any one cylinder as described above, the combustion of the engine 10 can be continued. Accordingly, the forced regeneration control can be executed without the engine stalling while the hybrid electric vehicle 1 is stopped.

Next, the rotation speed process will be described. When the forced regeneration request is issued, the ECU 100 controls the engine rotation speed when the forced regeneration request is issued to be higher than a rotation speed during an idle operation of the engine 10 while the hybrid electric vehicle 1 is stopped without the forced regeneration request. Further, the ECU 100 controls the engine rotation speed when the forced regeneration request is issued to be higher than a rotation speed of the engine 10 when the motor 15 is in the regenerative operation while the hybrid electric vehicle 1 is stopped without the forced regeneration request. Accordingly, an amount of oxygen supplied to the GPF 44 can be ensured, the combustion of the particulate matter accumulated in the GPF 44 can be accelerated, and thus the forced regeneration can be completed early.

Next, the ignition timing process will be described. When the forced regeneration request is issued, the ECU 100 controls the ignition timing of each of the cylinders #2, #3, #4 to which the fuel is supplied in the one-cylinder fuel cut process to be the same as an ignition timing during the idle operation of the engine 10 while the hybrid electric vehicle 1 is stopped without the forced regeneration request. Here, in order to accelerate the combustion of the particulate matter accumulated in the GPF 44, the ignition timing when the forced regeneration request is issued is considered to be retarded from the ignition timing during the idle operation. However, the influence of the retardation of the ignition timing on a combustion speed of the particulate matter is not as large as the combustion speed with respect to the increase in engine rotation speed. Therefore, even in the forced regeneration, with the control of the ignition timing to be the same as the ignition timing during the idle operation, the forced regeneration control can be executed with suppressed complicated control.

In the above embodiment, the hybrid electric vehicle equipped with the engine 10 and the motor 15 as the traveling power source is exemplified as an example of the hybrid electric vehicle, but the present disclosure is not limited thereto. For example, a hybrid electric vehicle may be employed in which an engine and first and second motors are provided as the traveling power source and a planetary gear mechanism including a sun gear connected to the first motor, a ring gear connected to the drive wheels and the second motor, and a carrier connected to the engine is further provided. Further, an engine vehicle having solely an engine as the traveling power source may be employed.

In the above embodiment, the one-cylinder fuel cut control of stopping the fuel supply to one of a plurality of cylinders #1, #2, #3, #4 has been described as an example, but the present disclosure is not limited thereto. For example, fuel cut control of supplying the fuel to at least one cylinder while stopping the fuel supply to a plurality of remaining cylinders may be performed. For example, when a V-type engine is provided with GPFs respectively corresponding to right and left banks, the fuel cut control may be executed for one of a plurality of cylinders in the right bank and one of a plurality of cylinders in the left bank.

Although the embodiments of the present disclosure have been described in detail above, the present disclosure is not limited to such specific embodiments, and various modifications and changes can be made within the scope of the gist of the present disclosure described in the scope of claims.

What is claimed is:

1. A filter regeneration control device for a particulate filter provided in an exhaust passage of a vehicle equipped with a traveling power source including an engine with a plurality of cylinders, the filter regeneration control device comprising:

a fuel supply controller configured to control fuel supply to the plurality of cylinders; and a rotation speed controller configured to control a rotation speed of the engine, wherein, when a forced regeneration request for burning particulate matter collected in the filter is received while the vehicle is stopped and the engine is in an idle operation, the filter regeneration control device executes a filter regeneration control in which:

the fuel supply controller stops the fuel supply to at least one cylinder of the plurality of cylinders while supplying fuel to remaining cylinders of the plurality of cylinders, and the rotation speed controller increases the rotation speed of the engine so as to be greater than a normal idle rotation speed of the idle operation.

2. The filter regeneration control device according to claim 1, wherein:

the vehicle is a hybrid electric vehicle;

the traveling power source further includes an electric motor; and when the electric motor is in a regenerative operation during the filter regeneration control, the rotation speed controller increases the rotation speed of the engine so as to be greater than a normal regenerative rotation speed of the regenerative operation.

3. The filter regeneration control device according to claim 2, further comprising an ignition timing controller configured to control an ignition timing of the plurality of cylinders, wherein, during the filter regeneration control, the ignition timing controller maintains an ignition timing of the remaining cylinders to be equal to a normal ignition timing of the idle operation.

* * * * *